T. A. WILLARD.
STORAGE BATTERY.
APPLICATION FILED DEC. 21, 1914.
1,249,268.
Patented Dec. 4, 1917.
2 SHEETS—SHEET 1.
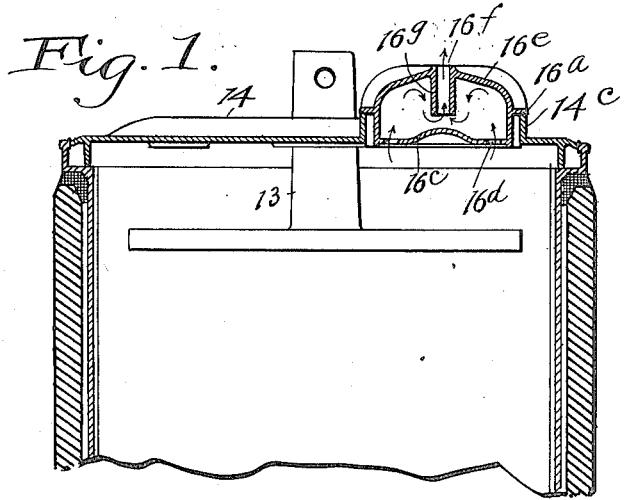
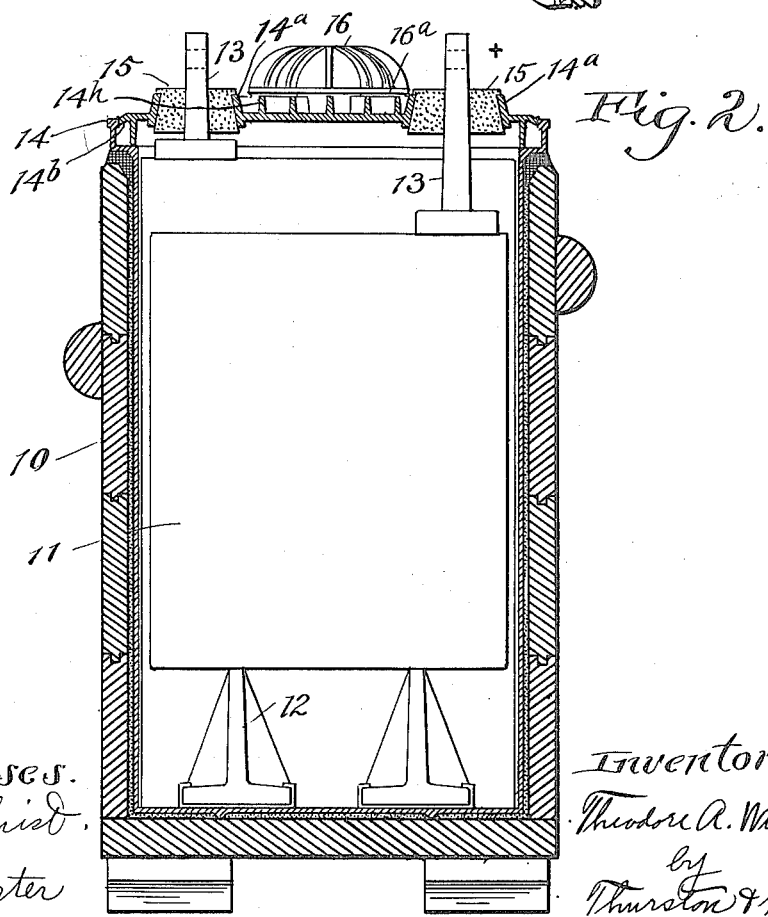

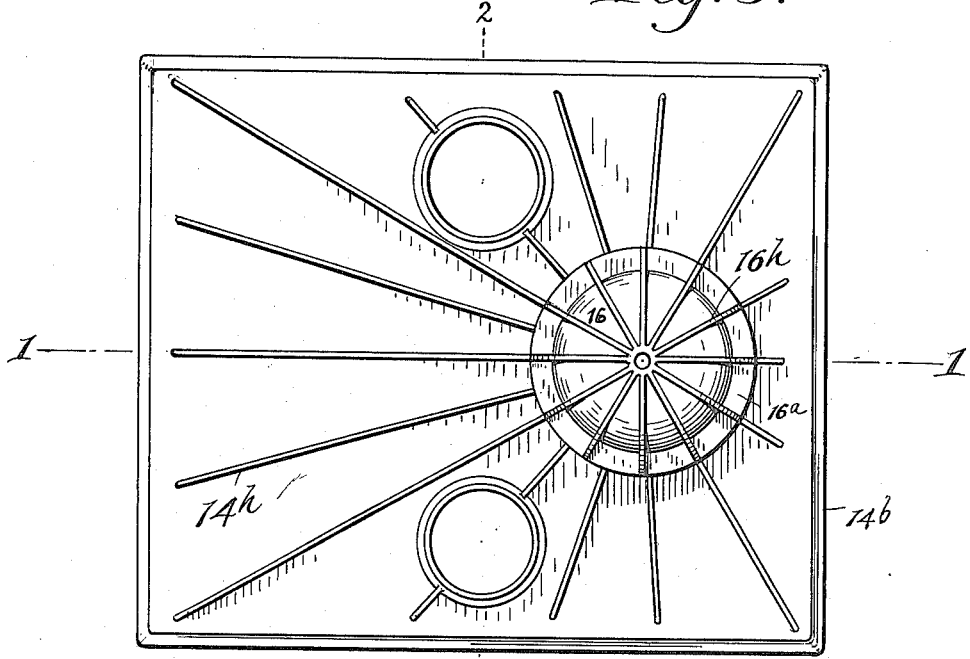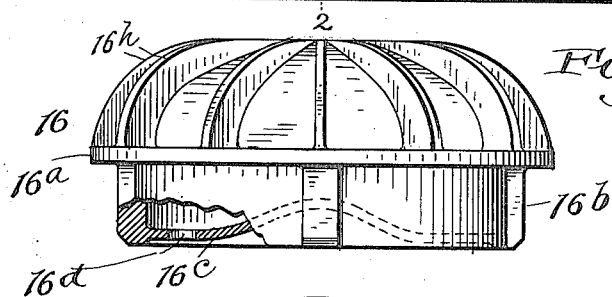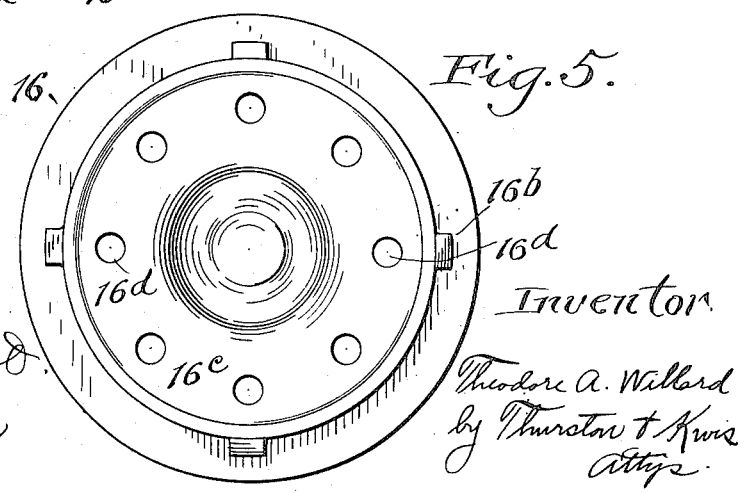

UNITED STATES PATENT OFFICE.

THEODORE A. WILLARD, OF CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY.

1,249,268.  Specification of Letters Patent.  Patented Dec. 4, 1917.

Application filed December 21, 1914. Serial No. 878,241.

*To all whom it may concern:*

Be it known that I, THEODORE A. WILLARD, a citizen of the United States, residing at Cleveland, in the county of Cuyahoga and State of Ohio, have invented a certain new and useful Improvement in Storage Batteries, of which the following is a full, clear, and exact description.

This invention relates to storage batteries and has for its main object the provision of certain improvements which increase the efficiency, action, and durability of storage batteries.

More specifically considered, the invention resides in means for preventing a high rise in temperature by providing for very rapid dissipation of heat, and also in a means for preventing loss of electrolyte by slopping or by being carried away in the form of a vapor or with a gas that is given off while the battery is being charged, the latter being accomplished by a peculiarly shaped device which I term a condensing dome and is designed to be provided in the cover.

My invention may be further briefly summarized as consisting in certain details of construction and combinations and arrangements of parts which will be described in the specification and set forth in the appended claims.

In the accompanying sheets of drawings wherein I have shown one embodiment of my invention, Figure 1 is a vertical sectional view substantially along the line 1—1 of Fig. 3; Fig. 2 is a vertical sectional view substantially along the line 2—2 of Fig. 3; Fig. 3 is a top plan view of the cover including the condensing dome, this view being on a somewhat enlarged scale; Figs. 4 and 5 are side and bottom plan views, respectively, on a still further enlarged scale, of the condensing dome.

Referring to the drawings, 10 represents the casing or container of the battery, the casing being preferably formed of wood and provided with an inner lead lining. The battery includes the positive and negative plates 11 which are supported at a suitable distance from the bottom of the container on supports 12, the plates being provided with terminal posts 13 extending outwardly through the cover. The parts so far described may be of any suitable construction.

Referring now to the upper part of the battery wherein my improvements are provided, it will be observed that the battery is provided with a cover 14 which in this instance is made of lead, in order that it will not be affected by the acid of the battery and in order that it may conduct heat rapidly. The cover has along its marginal edges a laterally projecting flange $14^b$ which will be lead-burned to the upper marginal portion of the lead lining of the container. The cover is provided also with a pair of oppositely disposed flanged openings or, bosses $14^a$ through which the terminal posts 13 extend and in which they are securely fastened by any suitable insulating securing material 15.

The cover is provided along its longitudinal center line and near one end of the battery with an upturned circular flange $14^c$ forming an annular opening in which is seated what I have previously termed the condensing dome 16. This condensing dome, as will be observed particularly from Fig. 1, is in the form of a hollow lead chamber provided with a laterally extending annular flange $16^a$ which rests upon the upper edge of the flange $14^c$ of the cover. The cylindrical portion of the dome extending downwardly beneath the flange $16^a$ is provided on its periphery with a series of spacing ribs $16^b$, any number of which may be provided and which engage with a close sliding fit the inner peripheral wall or surface of the upturned flange $14^c$ on the cover. This dome will not be fastened to the cover, but is seated in and on the flange, as above stated, in such a manner that it can be lifted off the cover when desired for the purpose of inspecting the parts beneath or of replenishing the battery solution.

It will be observed that the dome is provided with a bottom or bottom wall $16^c$, the middle portion of which is convexed upwardly so that the center of the bottom wall is higher than the marginal portions. Along the margin of the bottom wall are provided a series of inlet openings $16^d$, the number of which can be varied to suit requirements, these openings being provided for the ingress into the dome of vapor or gas which passes from the battery, particularly during the charging period. The top wall $16^e$ of the dome which is rounded or dome-shaped, as shown in the drawings, is provided at the center point with an outlet opening or vent 16$^f$, and with a downwardly projecting vent tube 16$^g$ which extends down toward and nearly to the convex or upwardly bowed part of the bottom wall 16$^c$ of the dome.

Additionally, the cover 14 and the dome 16 are provided with integral upwardly extending heat radiating flanges or ribs, those on the cover being designated 14$^h$ and those on the dome being designated 16$^h$. It will be observed that the ribs on the cover and dome all radiate from the center or vertical axis of the dome.

By reason of the construction of the dome, it is practically impossible for the battery solution to slop or splash out through the vent opening, this being true particularly because of the staggered relation of the inlet opening 16$^d$ and the central outlet opening 16$^f$, and because of the outlet tube 16$^g$ which extends downwardly nearly to the bottom of the dome. Because of the ribs or the flanges provided on the dome and cover, the heat will be dissipated very rapidly and vaporization of electrolyte will be minimized. Additionally, because of the circuitous path that the vapors take in reaching the vent or outlet opening, and because they pass upwardly and come in contact with the cooled top of the dome in passing from the inlet opening 16$^d$ to the outlet opening 16$^f$, a considerable portion of the vapor will be condensed and will fall on to the convex bottom wall of the dome and then pass by gravity back into the battery. Additionally, most of the electrolyte which is carried into the dome by hydrogen which is evolved during the charging periods will attach itself or collect on the walls of the dome and eventually drop back into the battery, very little passing from the dome with the gas.

Not only do the flanges 14$^h$ and 16$^h$ cause the rapid dissipation of heat, but they also serve to strengthen the cover and dome, permitting the use of thin metal which is desirable from the standpoints of economy and lightness, and also because a thin metal cover with heat radiating flanges results in a more rapid dissipation of heat than a more massive cover. It might be added also that the radial arrangement of the ribs results in a much better cooling effect than ribs extending in one direction, especially when my invention is applied to batteries used for train lighting purposes, for the reason that while the train is in motion, the cooling air currents enter one side of the battery box, eddy or circulate over the battery covers, and then pass out through the opposite side. With the ribs arranged in parallel relation, this eddying effect would be more or less obstructed, and at the same time the ribs would not have the same strengthening effect as in the radial arrangement.

Having thus described my invention, what I claim is:—

1. A storage battery having a cover provided with a condensing chamber, the chamber having ribs on its outer surface.

2. A storage battery having a cover provided with an annular dome-shaped chambered member for the condensation of vapors, the said chambered member having on the exterior a plurality of flanges.

3. A storage battery having a cover provided with an opening, a condensing dome held in the opening, said dome and cover having external ribs or flanges.

4. A storage battery having a cover provided with an opening therein, a condensing dome in the opening, said cover and dome having ribs or flanges radiating from the center or axis of the dome.

5. A storage battery having a cover provided with a condensing dome, said cover and dome having external radially disposed ribs or flanges.

In testimony whereof, I hereunto affix my signature in the presence of two witnesses.

THEODORE A. WILLARD.

Witnesses:
E. B. GILCHRIST,
L. I. PORTER.